Aug. 21, 1962
I. JEPSON
3,050,093
PORTABLE POWER DRIVEN SAW
Filed Jan. 13, 1956
3 Sheets-Sheet 1
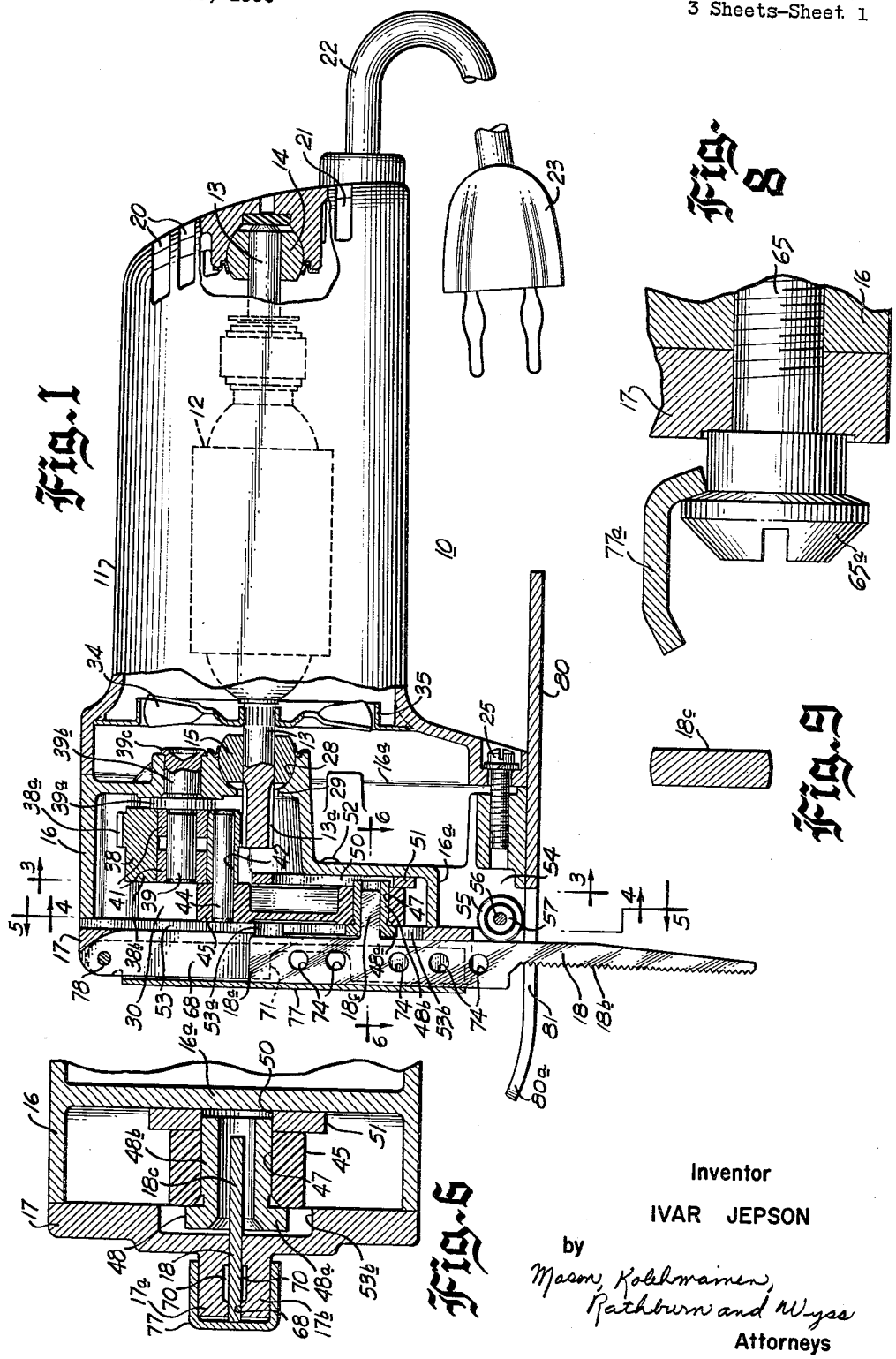
Inventor
IVAR JEPSON
by
Mason, Kolehmainen,
Rathburn and Wyss
Attorneys

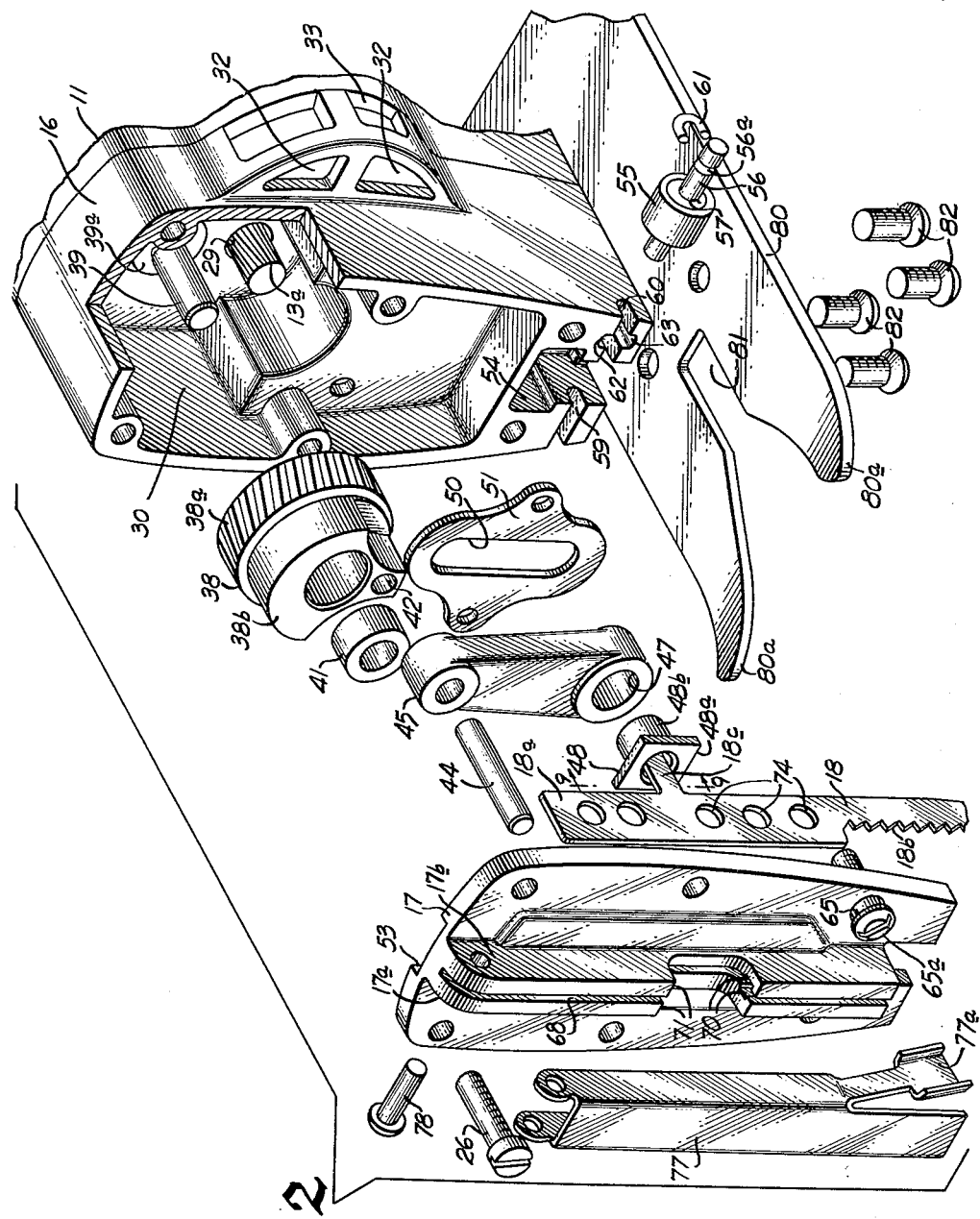

Aug. 21, 1962 — I. JEPSON — 3,050,093
PORTABLE POWER DRIVEN SAW
Filed Jan. 13, 1956 — 3 Sheets-Sheet 3
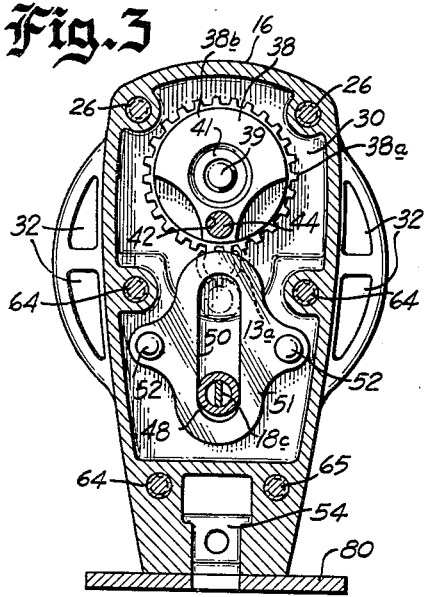
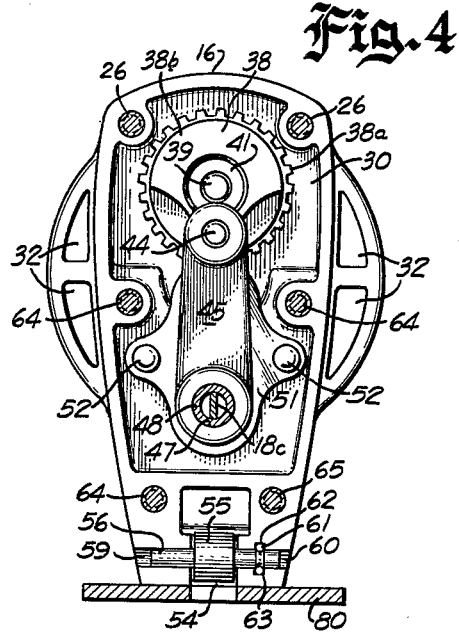
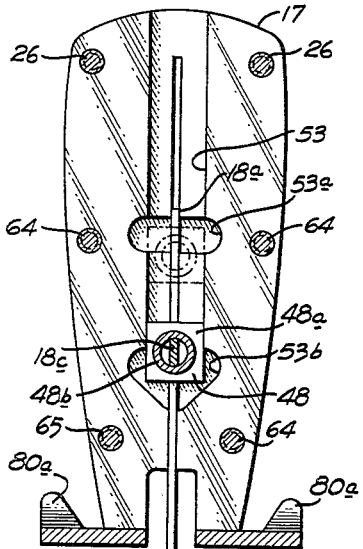
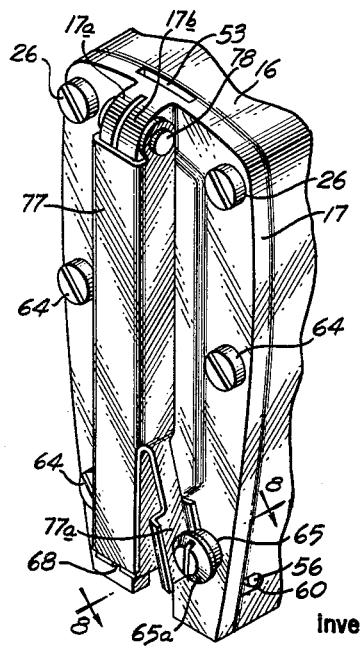
Inventor
IVAR JEPSON
by
Mason, Kolehmainen,
Rathburn and Wyss.
Attorneys

United States Patent Office 3,050,093
Patented Aug. 21, 1962

3,050,093
PORTABLE POWER DRIVEN SAW
Ivar Jepson, Oak Park, Ill., assignor to Sunbeam Corporation, Chicago, Ill., a corporation of Illinois
Filed Jan. 13, 1956, Ser. No. 558,878
13 Claims. (Cl. 143—68)

The present invention relates to a portable power driven saw, and more particularly to a portable electric saw of light weight and of the reciprocating blade type.

In recent years, and to some extent as a result of the "do-it-yourself" trend, there has been a greatly increased demand for portable power tools. Thus, there are available on the market today numerous electric drills, electric sanders, electric saws and the like. The portable power saw extensively used heretofore has utilized a rotary saw blade. Unfortunately, a power saw of the rotary blade type, although useful in many applications, has a number of limitations. For example, it cannot be used to cut along other than straight lines, and it is very difficult, if not impossible, to use a rotary blade saw for cutting enclosed openings in material. Heretofore there has been extensively sold what is known as a power operated jig saw which has a reciprocally movable flexible blade connected at each end to suitable actuating and support means. However, this device does not lend itself well to portable operation, and when used to cut openings in material, one end of the blade must first be released from the actuating and support means to permit its insertion into such openings. Consequently, there has been a demand for a so-called power operated jig saw, commonly termed a saber saw.

Saber saw attachments have been provided for power drills and the like. It is generally recognized, however, that the use of various attachments for converting power drills to multipurpose tools has not produced satisfactory results. Such attachments must be secured to the drill in some manner. This procedure is both time-consuming and bothersome, especially in view of the fact that the converted tool frequently does not perform its secondary task in a satisfactory manner. In addition, the drill is inoperative so far as its primary function is concerned whenever such attachments are being used in place of the drill bit. It would be desirable, therefore, to provide a lightweight, portable saber saw as a unitary device capable of performing a wide variety of cutting operations.

Power operated saws of the reciprocating blade type employing a rotary type prime mover have heretofore required a very complicated mechanism for converting the rotary motion of the prime mover to reciprocating motion of the saw blade. This has been particularly true where the prime mover has comprised a high-speed electric motor, in which case complicated and costly counterbalancing means were a characterizing feature of such prior art devices. It would be desirable to provide a power operated reciprocating saw in which such complicated and costly counterbalancing means may be eliminated, whereby to provide a simple and inexpensive power operated saw.

The average user of a power operated saber saw finds it desirable to be able to use such a saw for performing many cutting operations, each of which requires a somewhat different type of blade as far as the arrangement of the teeth thereon is concerned. Moreover, the nature of many of the cutting operations for which such a saw is used is such that different blades are frequently used for only relatively short periods of time. This means that if an assortment of blades for performing different cutting operations is employed, the user will have to change blades frequently in order to obtain the best results. It becomes very important, therefore, to provide a portable power operated saber saw in which different blades may be applied or removed quickly.

Accordingly, it is an object of the present invention to provide a new and improved power operated saw.

It is another object of the present invention to provide a portable electric saber saw which is extremely light in weight, which is simple and compact, and which is very satisfactory in operation.

It is a further object of the present invention to provide a lightweight, power operated saber saw with simple means for mounting the saw blade for ready removal and replacement so that a plurality of blades may be used interchangeably with substantially no time being required for changing from one blade to another.

Still another object of the present invention resides in the provision of a lightweight, power operated saw with improved means for relating the saw blade and the driving means therefor.

It is another object of the present invention to provide a power operated reciprocating saw blade having simple means integrally formed therewith for connecting the same to power operated means for actuating the same.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is an elevational view, with certain portions cut away, of a power operated saw embodying the present invention;

FIG. 2 is an enlarged exploded perspective view of a portion of the device shown in FIG. 1 of the drawings;

FIG. 3 is a sectional view taken on line 3—3 of FIG. 1, assuming that FIG. 1 shows the complete structure;

FIG. 4 is a sectional view taken on line 4—4 of FIG. 1, again assuming that FIG. 1 shows the complete structure;

FIG. 5 is a sectional view taken on line 5—5 of FIG. 1, illustrating the two extreme positions of a reciprocating saw blade, again assuming that FIG. 1 shows the complete structure;

FIG. 6 is an enlarged sectional view taken on line 6—6 of FIG. 1, with certain portions cut away, also assuming that FIG. 1 shows the complete structure;

FIG. 7 is a fragmentary perspective view of a portion of the device of FIG. 1 showing the means for locking the saw blade in position;

FIG. 8 is a greatly enlarged fragmentary sectional view taken on line 8—8 of FIG. 7; and FIG. 9. is an enlarged sectional view through a portion of the saw blade taken along line 9—9 of FIG. 2.

Briefly, the present invention comprises an electric motor mounted in a casing, which casing serves as the handle for the power tool, which in the instant situation is a portable saber saw. The casing includes a gear housing section which embodies therein a very simple, lightweight and compact mechanism for converting rotary motion of the electric motor to reciprocating motion of a saw blade. Attached to the housing is a saw blade guide having a slot for receiving and guiding an elongated reciprocally operable saw blade. A suitable cover is provided with latching means to hold the saw blade in the slot. Changing saw blades merely involves opening the cover, lifting the sal blade out of the slot and inserting another, followed by closing and latching the cover. The saw blade is provided with a simple integral extension for connection to the lightweight reciprocating drive mechanism. With the above arrangement there is eliminated the necessity for complicated costly counterbalancing means which have heretofore always been employed in reciprocating type saws driven by rotary power means.

Referring now to the drawings, there is illustrated in FIG. 1 the lightweight power operated saw of the present invention, generally designated by the reference numeral 10. As there illustrated, this saw comprises a motor casing or housing 11 within which is suitably mounted a conventional electric motor, not fully shown, comprising the armature 12 suitably mounted on a shaft 13 journalled in bearings 14 and 15, which bearings are disposed at opposite sides of the armature 12. Supported from the motor housing 11 is a combined gear housing and bearing plate 16 which houses a suitable mechanism described in detail hereinafter for converting rotary motion of the armature 12 to reciprocating motion of a saw blade. Secured to the gear housing 16 is a saw blade guide 17 for guiding the movement of a saw blade 18.

Although the housing 11 and incorporated electric motor may have any suitable construction or configuration, preferably the housing 11 is a somewhat cup-shaped housing formed of lightweight material such as aluminum or the like, and preferably comprises a suitable casting of this material. This housing has an external diameter such that it may conveniently be gripped by the user of the power operated saw 10, consequently functioning as the handle thereof. The closed end of the cup-shaped housing 11 is preferably provided with suitable openings such as 20 and 21 to serve as intake or exhaust openings for cooling air for cooling the motor disposed within the housing 11. Furthermore, the closed end of the housing 11 supports the bearing 14 for the armature shaft 13. Also as illustrated in FIG. 1 of the drawings, a conventional power cord 22 is indicated as entering the cup-shaped housing 11 through an opening provided in the closed end thereof, by means of which the electric motor within the housing may be connected to a suitable source of electric energy, the power cord 22 being provided with the conventional plug connector 23.

The gear housing and bearing plate 16, best shown in FIGS. 1 and 2 of the drawings, is preferably a casting of lightweight metal such as aluminum and has the lower end thereof secured to the housing 11 by a fastening means 25, shown in FIG. 1. The upper end is secured to the housing 11 by virtue of fastening means 26, as shown in FIGS. 2, 3, 4, 5 and 7 of the drawings, which fastening means 26 also hold the saw blade guide 17 in position relative to the combined gear housing and bearing plate 16. The gear housing and bearing plate 16 effectively defines a wall portion 16a closing the open end of the cup-shaped motor housing 11. This wall portion 16a defines a recess 28 and an opening 29, the recess receiving and supporting the bearing 15, while the opening 29 permits the end of the armature shaft 13 to extend through the wall portion 16a of gear housing 16 into a gear chamber 30 effectively defined within the gear housing 16. The end of the armature shaft 13 extending into the gear chamber 30 is provided with gear teeth effectively to define a gear 13a disposed within the gear chamber 30 which is rotatable at the speed of rotation of the armature 12.

For the purpose of permitting cooling air to flow through the housing 11 to cool the motor disposed therein, the housing 16 is provided with a plurality of openings 32 and 33 which afford access to the motor chamber within the housing 11. These openings 32 and 33 may be either ingress or exhaust openings, depending upon the direction of air flow through the motor. Preferably, to preclude drawing sawdust from the saw blade 18 into the openings 32 and 33 during a cutting operation, the latter are exhaust openings, although obviously the air could flow in either direction and still afford efficient cooling. Moreover, to insure the satisfactory flow of cooling air, a fan 34 is secured to the shaft 13 by any suitable means. This fan is disposed on the motor side of wall 16a within the motor housing 11. A suitable fan shroud 35 is illustrated as being mounted within the end of cup-shaped motor housing 11 and may be secured therein by any suitable means.

In order to transmit rotary motion of the gear 13a disposed within gear chamber 30 to reciprocating motion, there is provided a combined crank and gear member 38 which is rotatably mounted on a suitable stub shaft 39 secured to the wall 16a in the gear housing 16. As illustrated, the stub shaft 39 includes a central flange portion 39a from which there projects a support portion 39b which extends through the wall 16a. This stub shaft 39 may be secured to the gear housing in any suitable manner, and, as illustrated, the end thereof projecting into the motor housing is peened over as indicated at 39c, thereby firmly securing the stub shaft in position with the flanged portion 39a engaging the opposite side of the wall portion 16a from that engaged by the peened over portion 39c. A suitable two-part bearing 41 is disposed on the stub shaft 39 to insure satisfactory operation of the combined crank and gear. The stub shaft 39 is positioned relative to the gear 13a defined on the end of armature shaft 13 so as drivingly to relate the gear 13a and the gear 38a forming a part of the combined gear and crank 38. The crank portion designated as 38b of the combined gear and crank 38 is provided with an opening 42 to receive a crank pin 44 for engagement with a suitable pitman or connecting rod 45. The portion 38b of the combined gear and crank 38 is shaped so as to define a counterweight for balancing the unbalanced forces produced by virtue of the crank drive connection described above. Moreover, to reduce such unbalanced forces to a minimum, the connecting rod 45 is preferably formed of a very lightweight material such as a molded nylon.

For the purpose of converting the circular motion of the upper end of the connecting rod 45 secured to the crank pin 44 to reciprocating motion, means are provided to guide the lower end of the connecting rod 45. To this end, a saw blade drive bushing 48 is inserted in an opening 47 defined in the lower end of the connecting rod 45, as viewed in FIGS. 1 and 2 of the drawings. The bushing 48, which may be made of a drill rod or similar material, is provided with a guide flange 48a at one end secured to a tubular portion 48b which extends into the opening 47 in connecting rod 45 and projects beyond the end of the opening, as best shown in FIG. 1 of the drawings, to engage an elongated slot 50 defined in a drive bushing guide 51 which is secured as by suitable fastening means 52 to the gear housing and bearing plate 16. As shown in FIG. 1 of the drawings, the slot 50 extends in a vertical direction thereby confining the movement of the lower end of the connecting rod 45 solely to vertical movement, as viewed in FIG. 1 of the drawings. Preferably, the guide 51, which is secured by the fastening means 52 to the gear housing 16, is formed of bronze or other suitable material which will withstand the friction of the reciprocating drive bushing therein. To further guide the saw blade drive bushing, the flange 48a thereof is rectangular and is slidably received in a groove 53 defined in the side of saw blade guide 17 adjacent gear housing 16. It will thus be seen that the saw blade drive bushing 48 is guided at one end by the groove 53 and at the other end by the slot 50. These guides are on opposite sides of the connecting rod 45 and insure that drive bushing 48 will not twist regardless of the force applied thereto.

In order to accommodate a saw blade guide roller, the gear housing 16 is provided at its lower end, as viewed in FIGS. 1 and 2 of the drawings, with a recess 54 for accommodating a saw blade roller 55, preferably rotatably mounted on a pin 56 by means of a suitable bearing 57. The ends of the pin 56 are adapted to be disposed in opposed recesses 59 and 60 defined in gear housing 16. Moreover, to prevent axial movement of the pin 56, and consequently the associated roller 55, the pin is provided with a suitable annular recess 56a to receive a U-shaped retainer ring 61 insertable within suitable recesses such as 62 and 63 defined in gear housing 16, as best shown in FIG. 4 of the drawings. The retainer ring 61 is also maintained in position by the saw blade guide member 17 when the latter is secured to gear casing 16.

The saw blade guide member 17 effectively defines a closure for the chamber 30 within the gear housing 16 and is secured to the latter by means of the screws or fastening means 26 described above, which also secure the gear housing 16 to the motor housing 11. Additional fastening means 64 and 65 are provided, which aid in securing the saw blade guide 17 to the gear housing 16, the fastening means 65 being special fastening means described in greater detail hereinafter for performing another function in addition to holding the saw blade guide 17 to the gear housing 16. The saw blade guide 17 includes a pair of integral flanges 17a and 17b projecting from the side thereof not secured to the gear housing 16, which flanges are closely spaced to define a slot 68 therebetween for receiving the saw blade 18. Preferably, the slot is slightly greater than the width of the saw blade 18, and in an embodiment built in accordance with the present invention, where the saw blade was .057 of an inch in thickness with a tolerance of plus or minus five ten-thousandths, the slot had a width of between .059 and .062 of an inch. Moreover, to reduce the friction between the saw blade 18 and the walls defining the slot 68, the latter may be grooved or recessed. As best indicated in FIGS. 2 and 6 of the drawings, grooves 70 are provided on the adjacent faces of the flanges 17a and 17b defining the slot 68, which grooves extend in the direction of the reciprocal movement of the saw blade 18, whereby the saw blade is guided only at the front and rear edges thereof and makes no frictional engagement with the center portion of the slot 68.

With the above-described arrangement, it is apparent that the saw blade 18 is insertable into the slot 68, and to facilitate insertion, and particularly removal thereof, the projecting flanges 17a and 17b defining the slot 68 are cut away at an intermediate portion, as indicated at 71, to permit one readily to grasp the blade 18 within the slot to remove it or conversely to insert it in the slot 68. Moreover, this cutaway portion is of sufficient length to permit the operator readily to view the opening in guide bushing 48 in all positions thereof.

In order that the blade 18 may be driven from the connecting rod 45 in a simple manner, the former is provided with a somewhat rectangular portion 18a arranged to be disposed within the slot 68 for a reciprocal movement thereof. To reduce vibration to a minimum and also to reduce the unbalanced forces to a minimum, the portion 18a of the blade 18 is provided with a plurality of openings 74 therein which substantially reduce the weight of the saw blade. The lower end of the saw blade, as viewed in FIG. 1 of the drawings, is provided with teeth 18b which will, of course, be designed and depend upon the particular use to which the saw is to be put. Obviously, the saw may be used to cut wood, plastic, metal and the like, and different blades will be required for the different functions to be performed. The number of teeth per inch will of course vary, as well as other factors, in dependence upon the function to be performed. The edge of the saw blade 18 opposite the side upon which the teeth 18b are provided, which might be defined as the back end of the saw, is disposed to engage the saw blade roller 55 which oscillates back and forth as the saw reciprocates, thus providing a very low friction guide for the back of the saw.

In order drivingly to connect the saw blade 18 with the connecting rod 45, the former is provided with an integral projection 18c which extends from the back of the saw blade 18 and which is dimensioned so as to be received within the opening of the saw blade drive bushing 48. As is best shown in FIG. 9 of the drawings, the top and bottom edges of the projection 18c, as viewed in FIG. 1 of the drawings, are rounded to conform with the shape of the circular opening in the saw blade drive bushing 48. It will be apparent that when a saw blade is inserted in the slot 68, the drive lug or projection 18c thereon should be guided to be received within the saw blade drive bushing 48 so that upon rotary motion of the armature 12 of the motor disposed within housing 11 reciprocal movement of the saw blade 18 will occur. In an embodiment built in accordance wtih the present invention, the stroke of the saw was of the order of three-quarters of an inch. Obviously, however, this could be varied in dependence upon the positioning of the crank pin 44, and if a longer or shorter stroke is desired, suitable changes in this regard can readily be made. In FIG. 5 of the drawings, the two extreme positions of the drive bushing 48 are illustrated, and it may be noted that in each of these extreme positions the flange 48a disposed within guide slot 53 reaches an enlargement of the slot designated as 53a and 53b. These openings tend to reduce the friction at the ends of the stroke when the speed of movement is at a minimum.

To retain the saw blade 18 within the slot 68 in driving connection within the motor housing 11, there is provided a saw blade guide cover 77, which is of generally channel shape so as to fit over the exterior of the flanges 17a and 17b defining the saw guide slot 68 therebetween, as is best shown in FIGS. 6 and 7 of the drawings. As illustrated, the cover 77 is pivoted at the upper end thereof by a suitable pivot pin 78 to the saw blade guide member 17. When the cover is in the position shown in FIGS. 1 and 7 of the drawings, it is in what might be termed the closed position to maintain the saw blade 18 within the slot 68 and driving connection with the connecting rod 45. The construction is very simple in that one has merely to open the cover and remove the blade or insert the blade and close the cover and the device is in the inoperative or operative condition, respectively. Thus, it is particularly well adapted to ready interchangeability of the blades where the device may be used to perform numerous different sawing functions in relatively quick succession, as is often a requirement of the operator. It should be understood that the cover 77, instead of being pivotally mounted, could be bodily removable and function somewhat like a spring clip.

For the purpose of maintaining the cover 77 in closed position to maintain the saw blade 18 in operative condition, the cover 77 is provided with an integral latch member 77a cooperating with the head 65a of the fastening means 65 which functions as a catch. Actually, and as best shown in FIG. 8 of the drawings, the fastening means 65 is provided with a special head 65a serving as a catch to engage the latch or latching member 77a formed integrally with the cover 77. Since the cover 77 is preferably made of spring steel, the latch 77a will be inherently biased to the latching position indicated in FIGS. 7 and 8 of the drawings. It will be apparent that the operator merely need depress the latch or latching member 77a into or out of engagement with the catch member 65a formed as an integral part of the fastening means 65.

In using the saber saw or portable operated jig saw of the present invention, it is desirable to provide a suitable rest whereby the device may be rested on the work to be cut. To this end there is provided a base plate 80, preferably formed of spring steel or similar material, which is provided with a bifurcated portion defining a notch 81. As is best shown in FIG. 1 of the drawings, the saw blade 18 reciprocates within the notch 81, and the bifurcations therefor protect one from actually coming in contact with the saw blade. Moreover, the base 80 provides a rest which may be placed on the work. The forward portions of the bifurcations are preferably turned up as indicated at 80a in the form of runners readily to permit forward motion of the saw when the base plate 80 rests on the work. Preferably, the base plate 80 is secured to the gear casing 16 by fastening means 82. It will be understood that the housing 16 may be provided with means such as a recess or notch adjacent the base 80 for permitting ready attachment thereto of a suitable rip guide.

In view of the detailed description included above, the operation of the present invention will readily be understood by those skilled in the art and no further description thereof is necessary. There has been provided a very simple arrangement whereby one need merely open the cover 77 to replace a blade, which blade, when placed in the slot 68 with the integral lug 18c inserted within the saw blade drive bushing 48, is ready for immediate operation. It should be noted that the openings 53a and 53b are sufficiently long in the vertical direction to prevent damage should the saw be operated when the saw blade 18 is improperly inserted so that the lug 18c is not in bushing 48. With the above described arrangement, a very lightweight reciprocating drive mechanism is provided, and the necessity for costly counterbalancing means which has characterized prior art type saws is completely eliminated. Additional support for the reciprocating blade is provided by the saw blade roller 55 engaging the rear of the saw blade. The drive gear 38 is effectively a combined gear and crank which includes an integral weight for counterbalancing the unbalance created by the eccentrically mounted crank pin 44 and the associated connecting rod or pitman arm 45. Moreover, the whole device provides a very simple and compact arrangement which insures years of trouble-free service.

While there has been illustrated and described a particular embodiment of the present invention, it will be apparent that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. A portable power saw of the reciprocating blade type, comprising a housing, a rotary type prime mover disposed within said housing, means adjacent the housing for said prime mover defining a gear chamber, gear means driven by said prime mover disposed in said gear chamber, a combined gear and crank rotatably supported in said gear chamber and driven by said gear means, a pitman rod connected to said crank, a saw blade guide having a slot defined therein, means for securing said guide to said housing, a saw blade readily insertable into said slot, said saw blade having cutting teeth on one edge thereof and an integral driving lug extending from the edge opposite said one edge, cooperating means associated with said pitman rod and said saw driving lug drivingly to interrelate the same upon mere insertion of said blade into said slot with said driving lug engaging said cooperating means, and readily releasable means for maintaining said blade in said slot.

2. The power saw of claim 1 wherein said pitman rod is made of nylon.

3. In a portable power saw of the reciprocating blade type, the combination of a first housing of a configuration to define a handle for said saw, a rotary type prime mover disposed within said first housing, a gear housing secured to said first housing and having a gear chamber defined therein, gear means driven by said prime mover disposed in said gear chamber, a combined gear and crank rotatably supported in said gear chamber and driven by said gear means, a pitman rod connected to said crank a saw blade guide having a slot defined therein secured to said gear housing, a saw blade readily insertable into said slot, said blade having an integral driving projection extending from one edge thereof opposite the edge on which the teeth of said saw blade are formed, a guide bushing connected to said pitman rod having an opening for receiving said projection, means drivingly to interrelate said blade and pitman rod upon mere insertion of said blade and projection into said slot and said opening respectively, and readily releasable means for maintaining said blade in said slot.

4. The combination of claim 3 wherein said readily releasable means comprises a channel-shaped cover for closing said slot.

5. The combination of claim 4 wherein said cover is provided with a resilient latching member engageable with a catch secured to said saw blade guide.

6. The combination of claim 5 wherein said catch is part of fastening means for securing said saw blade guide to said gear housing.

7. A portable power saw of the reciprocating blade type, comprising a motor housing of a configuration to define a handle for said saw, a rotary type prime mover disposed within said motor housing, a gear housing secured to said motor housing and having a gear chamber defined therein, gear means driven by said prime mover disposed in said gear chamber, a combined gear and crank rotatably supported in said gear chamber and driven by said gear means, a lightweight pitman rod connected to said crank, a saw blade guide having a slot defined therein secured to said gear housing, a saw blade insertable into said slot, said blade having an integral projection from one edge thereof, a guide bushing connected to said pitman rod having an opening for receiving said projection, a rectangular flange secured to said guide bushing, means on said saw blade guide for confining movement of said rectangular flange to reciprocal movement parallel with the longitudinal axis of said slot, means drivingly to interrelate said blade and pitman rod upon insertion of said blade and projection into said slot and said opening respectively, and means for maintaining said blade in said slot.

8. The combination of claim 7 wherein said guide means only partially confines said rectangular flange near the extremities of the reciprocal path of movement thereof.

9. The power saw of claim 3 wherein means are provided on either side of said pitman rod to guide said guide bushing in its reciprocal movement and prevent twisting thereof by forces applied thereto by said saw blade.

10. A saw blade for use in a saber saw comprising a thin elongated member including a cutting portion and a guiding portion, said cutting portion having a length of the order of the length of said guiding portion, said cutting portion having saw teeth along one edge thereof and a relatively smooth surface along the other edge, and an integral narrow driving lug extending at substantially a right angle to the longitudinal axis of said member from an intermediate part of said guiding portion on the edge thereof coextensive with said smooth surface of said cutting portion, said lug having a length of the order of the width of said guiding portion and being the sole means by which a driving force for moving said blade is applied thereto.

11. The saw blade of claim 10 wherein said guiding portion is of rectangular configuration and a plurality of openings are provided therein.

12. A portable power saw of the reciprocating blade type comprising a housing, a rotary type prime mover disposed within said housing, motion converting means disposed within said housing including a rotary member drivingly connected to said prime mover and a reciprocating member drivingly connected to said rotary member whereby rotary motion of said prime mover is converted to reciprocating motion of said reciprocating member, means at one end of said housing defining an elongated narrow slot open on one side along its length, a thin saw blade having a thickness less than the width of said slot and including a portion insertable edgewise into the elongated open side of said slot, cutting teeth along one edge of said blade, interengaging parts on said reciprocating member and on an edge of said blade opposite that on which said cutting teeth are disposed for drivingly relating said blade and said reciprocating member upon mere insertion of said blade into said slot, said interengaging parts including a projection and a recess, and releasable means for maintaining said blade in said slot and consequently in driving engagement with said motion converting means.

13. A portable power saw, comprising a support including means defining an elongated slot, a reciprocally movable blade disposed in said slot and guided thereby, motive means including means for reciprocating said blade in said slot, said blade being readily removable from said slot and from driving connection with said motive means by mere lifting thereof out of said slot, and a readily releasable cover for all but the ends of said slot maintaining said blade in said slot, said cover having one end thereof pivotally mounted to said support, said slot being defined between adjacent closely spaced flanges projecting from said support, said support including guide means on the side thereof opposite said flanges for guiding reciprocal movement of said means for reciprocating said blade.

References Cited in the file of this patent

UNITED STATES PATENTS

| | | |
|---|---|---|
| 1,898,956 | Harvie | Feb. 21, 1933 |
| 2,695,522 | Papworth | Nov. 30, 1954 |
| 2,698,621 | Fernandez | Jan. 4, 1955 |
| 2,704,941 | Holford | Mar. 29, 1955 |
| 2,722,244 | Schultz | Nov. 1, 1955 |
| 2,735,458 | Buchmann | Feb. 21, 1956 |
| 2,746,493 | Babcock | May 22, 1956 |

FOREIGN PATENTS

| | | |
|---|---|---|
| 233,251 | Great Britain | May 7, 1925 |
| 799,152 | France | Mar. 27, 1936 |